United States Patent [19]  
Biedermann et al.

[11] 4,057,513  
[45] Nov. 8, 1977

[54] HYDROGENATION CATALYST AND PROCESS FOR PREPARING SAME

[75] Inventors: Wolfgang Biedermann; Horst Köller, both of Krefeld, Germany

[73] Assignee: Bayer Aktiengesellschaft, Leverkusen, Germany

[21] Appl. No.: 651,994

[22] Filed: Jan. 23, 1976

[30] Foreign Application Priority Data

Feb. 14, 1975 Germany .............................. 2506348

[51] Int. Cl.² .................. B01J 29/10; B01J 29/20; B01J 29/00
[52] U.S. Cl. .................................. 252/459; 252/451; 252/454
[58] Field of Search ................ 252/459, 471, 451; 260/563 C

[56] References Cited

U.S. PATENT DOCUMENTS

| | | | |
|---|---|---|---|
| 2,040,233 | 5/1936 | Adkins | 252/459 |
| 2,129,631 | 9/1938 | Winans | 260/563 C |
| 2,381,473 | 8/1945 | Teter | 252/459 X |
| 2,617,774 | 11/1952 | Rottig et al. | 252/451 |
| 2,727,056 | 12/1955 | Gross et al. | 252/451 X |
| 3,087,966 | 4/1963 | Currier et al. | 260/563 |
| 3,829,393 | 8/1974 | Sutherland et al. | 252/459 |

Primary Examiner—Carl F. Dees  
Attorney, Agent, or Firm—Burgess, Dinklage & Sprung

[57] ABSTRACT

A hydrogenation catalyst containing cobalt, manganese and copper in the form of their oxides and alkali metal oxide and silicon dioxide. A weight ratio of cobalt to maganese is 25:1 to 1:1, and the copper content is 0.01 to 2% by weight based on a total weight of the catalyst. The catalyst is prepared by adding an excess of an aqueous solution of a hydroxide, bicarbonate or carbonate of an alkali metal to an aqueous solution of water-soluble cobalt salts, manganese-(II) salts and copper salts to form a precipitate. Thereafter an aqueous solution of an alkali metal silicate or SiO₂ sol is added to the precipitate which is filtered off and washed with water to remove excess alkali metal hydroxide, bicarbonate or carbonate. The precipitate is then dried and calcined to form the catalyst.

15 Claims, No Drawings

HYDROGENATION CATALYST AND PROCESS FOR PREPARING SAME

BACKGROUND

This invention relates to a hydrogenation catalyst containing cobalt, manganese, copper, alkali and silicon dioxide a process for its preparation and its use for the preparation of dicyclohexylamine.

German Pat. No. 1,568,188 discloses a catalyst which contains cobalt and manganese in the form of oxides on pumice and which is used for the catalytic hydrogenation of 4,4'-diamino-3,3'-dimethyldiphenylethane. Furthermore, German Published Specification No. 2,314,813 discloses a catalyst which contains cobalt, manganese and, optionally, copper and which is used in the preparation of d,l-menthol by catalytic hydrogenation of corresponding unsaturated compounds.

Dicyclohexylamine can be obtained in accordance with the process of German Pat. No. 805,518 by catalytic hydrogenation of aniline in the presence of a nickel catalyst; the by-products obtained at the same time are cyclohexylamine and cyclohexanol. The catalytic hydrogenation of diphenylamine to cyclohexylamine using a nickel catalyst is also known (J. Amer. Chem. Soc. volume 53, page 1869 (1931); Chemical Abstracts, volume 67, 43121r (1967)); however, here again considerable amounts of by-products are obtained. None of the known processes gives a dicyclohexylamine which can be used without additional purification.

There is, therefore, a great need for a better catalyst which makes it possible to obtain directly a pure dicyclohexylamine by catalytic hydrogenation of diphenylamine.

SUMMARY

A catalyst containing cobalt, manganese and copper in the form of their oxides has now been found, which contains cobalt and manganese in a weight ratio of cobalt to manganese, of 25:1 to 1:1 and 0.01 to 2 percent by weight of copper based on the total weight of catalyst as well as an alkali metal oxide and silicon oxide.

DESCRIPTION

The weight ratio of Co : Mn is preferably 3:1.

The copper content is preferably between 0.05 and 0.5 percent by weight, based on the total weight of catalyst. The above percentages of metals are in each case calculated as the metals themselves.

The alkali metal oxide content of the catalyst according to the invention in general corresponds to 0.02 to 0.35, preferably 0.1 to 0.3, percent by weight of alkali metal based on the total weight of catalyst.

The $SiO_2$ content of the catalyst according to the invention is in general 0.005 to 5, preferably 0.05 to 3, percent by weight based on the total weight of catalyst.

Lithium, sodium, potassium and rubidium, but preferably potassium, may be mentioned as alkali metal elements.

The manufacture of catalysts containing manganese, cobalt and copper is known or can be carried out in accordance with known processes (compare Catalysis, volume I, pages 315 – 352, New York, 1954 (Library of Congress Catalog Card No. 54 - 6801); Dolgow, Die Katalyse in der *Organischen* Chemie (Catalysis in Organic Chemistry), pages 38 – 45, VEB Deutscher Verlag der Wissenschaft, Berlin, (1963).

To prepare the catalyst according to the invention it is possible, in general, to prepare an appropriate mixture of the hydroxides and/or carbonates of cobalt, manganese and copper, to which are added alkali metal compounds and silicon compounds and to calcine the mixture as the last stage of the preparation of the catalyst, to convert the compounds to the corresponding oxides. Thereafter, this catalyst precursor is calcined.

At the same time it is essential for the preparation of the catalyst according to the invention, that manganese compounds of valency level II should be used as a starting material.

Thus it is possible, for example, to use an aqueous solution of water-soluble cobalt salts, manganese (II) salts and copper salts, for example nitrates, sulphates, acetates and chlorides, it also being possible for the individual metal salts to have different anions, and to precipitate therefrom a mixture of the corresponding hydroxides and/or carbonates by means of an excess of an aqueous solution of the hydroxide, bicarbonate or carbonate of the selected alkali metals; particularly in the case of precipitation with alkali metal bicarbonate solution and/or alkali metal carbonate solution, the precipitate obtained in general contains an excess of alkali metal compound. This excess of alkali metal compound can be eluted by washing with water until the desired alkali metal content is reached.

It is also possible to carry out the precipitation with, for example, ammonia or ammonium carbonate solution and subsequently to impregnate the precipitate with an aqueous solution of an alkali metal salt or mix it with the appropriate amount of a solid alkali metal salt, but in general this method is not convenient.

As has been mentioned, the carbonates or hydroxides can also be precipitated from an aqueous solution of corresponding halides. In that case it is desirable subsequently to wash the precipitate with water to remove halide ions.

Silicon dioxide is an essential constituent of the catalyst according to the invention; to introduce it into the catalyst it is, in principle, possible to use all silicon compounds which in the course of the further preparative measures give $SiO_2$; however it is desirable not to use any silicon-halogen compounds but, advantageously, alkali metal silicates or, for example, $SiO_2$ sols.

It is particularly advantageous to use aqueous solutions of alkali metal silicates, such as sodium silicate or potassium silicate, for example a waterglass solution. It is possible, after precipitation of the hydroxides, bicarbonates and/or carbonates of cobalt, manganese, copper and, if appropriate, of the alkali metal element, to add $SiO_2$ sol or waterglass solution to the precipitates obtained and, for example, to impregnate the precipitate therewith, but a particularly advantageous procedure is directly to add an appropriate amount of waterglass solution to the aqueous solution from which the hydroxides, bicarbonates or carbonates have been precipitated, stir the mixture for some time longer, for example 1 – 10 hours, preferably 2 – 4 hours, and only then filter off the precipitate which has separated out.

In the procedure for preparing the catalyst according to the invention it is particularly advantageously to add an excess of an aqueous alkali metal carbonate solution, preferably potassium carbonate solution, to an aqueous solution which contains appropriate amounts of cobalt salts, manganese-(II) salts and copper salts and, after the corresponding carbonates have been precipitated, to add an appropriate amount of water-glass solution, filter off the precipitate which has separated out after it has stood, or been stirred, for some time longer, and then elute it with water until the desired alkali metal content has been reached, which can be ascertained in a simple manner in accordance with known analytical methods.

In general, an appropriate alkali metal content can be reached when the wash water which issues contains no alkali metal ions or only contains constant amounts thereof. To ascertain this it is possible to employ, in a manner which is in itself known, not only the analytical determination of the alkali metal content but also other customary methods of analysis, for example the determination of the conductivity of the filtrate.

The catalyst precursor thus obtained, which contains cobalt, manganese-(II), copper and alkali metal hydroxides, bicarbonates and/or carbonates and $SiO_2$ in the desired ratio, is then dried, decarbonated by heating and calcining and converted to the oxide state.

The drying and/or decarbonating can advantageously be carried out in a stream of inert gas, preferably nitrogen.

The end of the drying, like the end of the decarbonation, can be ascertained in accordance with analytical methods which are in themselves known, for example from the non-occurrence of a further weight decrease of the catalyst or cessation of the release of water and/or carbon dioxide, which can be ascertained, for example, by measuring the density of the inert gas which issues.

If the catalysts according to the invention, manufactured in this way, should be obtained in a pulverulent form, they can be brought to a particulate form in a known manner by pressing the catalyst powder, if appropriate with the addition of, for example, 0.1 to 2 percent by weight of graphite as a lubricant. At times it can also be advantageous first to grind the catalyst obtained to a powder of uniform particle size after calcining and before pressing.

Furthermore it can at times be advantageous again to break up and/or to grind the mouldings obtained by pressing the powder and again to press the product, that is to say to manufacture the mouldings with pre-densification.

In general, it is advantageous to treat the catalyst according to the invention with hydrogen before it is used. The end of the treatment with hydrogen can be ascertained particularly advantageously by following the water content of the hydrogen which issues, for example by density measurement; as soon as the hydrogen which issues contains no water or only contains traces of water at constant concentration, the hydrogen treatment can be terminated.

It can be particularly advanatgeous now to use the hydrogen-treated catalyst directly; preferably, the treatment of the catalyst is thus carried out directly in the apparatus used for the process. As soon as the treatment with hydrogen has ended, the pressure and temperature are adjusted to the required reaction conditions and a start is made with feeding in the starting material and carrying out the process using the catalyst according to the invention.

The catalyst according to the invention can be used particularly advantageously for the catalytic hydrogenation of diphenylamine at elevated pressure and elevated temperature.

Accordingly, the invention also relates to a process for the manufacture of dicyclohexylamine by catalytic hydrogenation of diphenylamine at elevated pressure and elevated temperature, wherein diphenylamine is treated with hydrogen in the presence of a catalyst according to the invention.

The starting compound, diphenylamine, is known.

In general, the process according to the invention is carried out in the temperature range of 100° to 250° C, preferably in the temperature range of 160° to 230° C, and especially in the temperature range of 170° to 210° C.

In general, the hydrogen pressure for the catalytic hydrogenation of diphenylamine in accordance with the invention is selected to be higher than 50, preferably 150, and in particular higher than 200, bars; there is no essential upper limit to the hydrogen pressure but such a limit may be imposed by the apparatus; in general, therefore, a higher pressure than 350 bars will be unsuitable.

In the catalytic hydrogenation of diphenylamine in accordance with the invention, hydrogen is used in excess over the stoichiometrically required amount. In general, more than 10 mols, preferably 12 to 15 mols, of hydrogen are employed per mol of diphenylamine; there is no essential upper limit to the excess of hydrogen, but the use of more than 50 mols of hydrogen per mol of diphenylamine is in general inappropriate.

Of course, the process according to the invention can also be carried out batchwise; however, it is particularly advantageous to carry it out continuously.

The process according to the invention can be carried out in any manner known and customary for carrying out catalytic hydrogenations.

It is possible to use either the fluidised bed process or the fixed bed process, the latter, for example, with a fixed arrangement of the catalyst in a shaft furnace.

Equally, the reaction can be carried out either in the liquid phase or in the gas phase.

An advantageous method is to carry out the reaction continuously in the trickle gas phase over fixed catalyst mouldings. In this case, the starting material and end product of the reaction may be entirely or partially in the gas phase and/or the liquid phase. In each individual case, the particular state depends on the amounts, temperatures and pressures used.

Diphenylamine and hydrogen can be introduced into the reaction space conjointly or separately; they can beforehand be heated, conjointly or separately, to the reaction temperature.

The reaction in accordance with the following equation

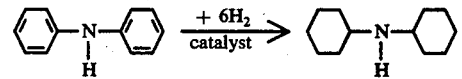

is exothermic; the heat of reaction can be conducted away in any form, for example by external cooling of the reaction space. It is particularly advantageous not to introduce the total amount of hydrogen all at once into the reaction space. Rather, only a part of the amount of hydrogen is added directly to the starting material entering the reaction space and the remaining hydrogen is added without prior warming, in amounts corresponding to its consumption as the reaction progresses, to the reaction mixture moving through the reaction space, the addition being made at appropriate points distributed over the entire length of the reaction space. In this way, the heat of reaction is in each case entirely or partially consumed through heating the cold hydrogen to the reaction temperature.

After issuing from the reactor, the dicyclohexylamine can be separated out from the reaction gas as a liquid, for example by cooling and/or by continuous release of pressure.

The excess hydrogen can advantageously be recycled so that only the hydrogen consumed in the reaction must be introduced, as fresh hydrogen, into this recycled stream.

The advantages of the catalyst according to the invention manifest themselves particularly when it is used for the catalytic hydrogenation of diphenylamine to dicyclohexylamine.

The advantage of the hydrogenation process according to the invention is that dicyclohexylamine of very high purity, which conforms directly, without additional purification, to normal requirements, is obtained with excellent conversions and yields. In the manufacture of dicyclohexylamine by catalytic hydrogenation of aniline in accordance with the process of German Pat. No. 805,518, the best that can be obtained, according to the example, is a crude product which still contains 4% of cyclohexylamine and 1% of aniline and cyclohexanol. In the catalytic hydrogenation of diphenylamine, again, a yield of dicyclohexylamine of only 88.5% has been achieved on quantitative uptake of hydrogen (Chemical Abstracts, volume 67, 43121r (1967)).

Dicyclochexylamine is used, for example, in the rubber industry and in corrosion protection.

EXAMPLE 1

12 kg of an iron-free aqueous manganese nitrate solution containing 38.5 g of manganese/kg and 25 kg of an iron-free aqueous cobalt chloride solution containing 36 g of cobalt/kg were combined; thereafter, a solution of 200 g of copper sulphate containing water of crystallisation ($CuSO_4 \cdot 6 H_2O$) in 1.5 kg of water was added to the preceding solution, which had a pH value of about 4. The solution was then rendered alkaline by adding 20% strength by weight aqueous potassium carbonate solution whilst stirring, until, on further addition, no additional precipitation occurred, for which about 25 kg of the potassium carbonate solution were required. 300 ml of a 10% strength by weight waterglass solution were then also added.

The precipitate which separated out was filtered off about 3 hours later; the filter cake obtained was washed with distilled water until the filtrate which issued had a conductivity of less than 50 μSiemens. The filter cake was then dried at 120° C for 12 hours, decarbonated by heating to about 300° C for 6 hours, ground after cooling and moulded, with addition of 0.2% by weight of graphite as lubricant, by pressing to form cylinders of size 5 × 5 mm (height × diameter).

The moulding thus obtained had a bulk density of about 1.25; the total amount was 2002 g.

The analysis showed:

24.5% by weight of Mn
49.0% by weight of Co,
0.2% by weight of Cu,
0.09% by weight of K,
0.21% by weight of $SiO_2$.

EXAMPLE 2

Analogously to the procedure in Example 1, further catalysts were manufactured with appropriately selected amounts of the same solutions.

After drying and decarbonation, the analysis of the catalysts obtained gave the values shown in Table I below, which are each percentages by weight.

Table I

| Catalyst | Co | Mn | Cu | K | $SiO_2$ |
|---|---|---|---|---|---|
| A | 49.1 | 30.1 | 0.22 | 0.08 | 0.23 |
| B | 49.2 | 14.6 | 0.24 | 0.07 | 0.22 |
| C | 49.0 | 24.3 | 0.24 | 0.41 | 0.24 |
| D | 49.3 | 24.3 | 0.25 | 0.08 | 1.14 |
| E | 48.9 | 24.1 | 0.21 | 0.09 | 0.05 |
| F | 49.1 | 24.4 | 0.48 | 0.07 | 0.21 |

EXAMPLE 3

A high pressure tube of 30 mm internal diameter and 1,000 mm length was filled with 1,000 ml of the catalyst obtained according to Example 1. The temperature was raised to 210° C over the course of 10 hours at 30 to 40 bars whilst passing nitrogen through the mixture and the catalyst was dried in this way; the gas flow rate was 5 $Nm^3$ of $N_2$/hour. This flow speed was kept constant over the entire duration of the experiment.

Thereafter the temperature was raised by 15° C per hour and the nitrogen was slowly replaced by hydrogen so that the gas mixture of nitrogen and hydrogen flowing through contains a constantly rising proportion of hydrogen, until, at 300° C, only hydrogen is passed through.

5 $Nm^3$ of hydrogen were now passed through per hour for a further 12 hours at 300° C and a rising pressure between 30 and 200 bars.

Thereafter, the catalyst was cooled to 180° C and this temperature was then maintained. The hydrogen pressure was raised to 290 bars and 200 ml of diphenylamine ($d_{60}$ = 1.061) per hour were metered into the stream of hydrogen, the diphenylamine having been heated to about 170° C by means of a preheater; the excess hydrogen over the stoichiometrically required amount was 2.4 $Nm^3$/hour under normal conditions (0° C/760 mm Hg).

The reaction mixture leaving the high pressure tube was cooled to about 20° C and the pressure was released. This gave 226 g (99.5% of theory) of dicyclohexylamine per hour; the analysis by gas chromatography showed 99.6% by weight of dicyclohexylamine, 0.25% by weight of cyclohexylamine and 0.15% by weight of cyclohexane.

According to analysis by UV spectroscopy, the contamination by diphenylamine was at most 0.001% by weight.

Other by-products, above all phenylcyclohexylamine, were not detectable.

EXAMPLE 4

The procedure followed was as in Example 3 except with the modification that the hydrogenation of the diphenylamine was carried out at 175° C instead of 180° C. According to analysis by gas chromatography, the reaction product thus obtained consisted of 99.6% of dicyclohexylamine, 0.35% of cyclohexylamine and 0.04% of cyclohexane.

EXAMPLE 5

The procedure described in Example 3 was followed except with the modification that diphenylamine was hydrogenated at 195° C instead of 180° C. The reaction mixture obtained consisted, according to analysis by gas chromatography, of 99.5% of dicyclohexylamine, 0.15% of cyclohexylamine and 0.31% of cyclohexane.

EXAMPLE 6

The experiment described above in Example 3 was repeated with the catalysts described in more detail in Example 2 in the same manner except that in each case the catalyst shown below was used instead of the catalyst obtained according to Example 1.

Table II which follows shows the composition of the reaction product obtained in each case, as determined by analysis by gas chromatography.

Table II

| Catalyst | Dicyclohexylamine % | Cyclohexylamine % | Cyclohexane % | US* |
|---|---|---|---|---|
| A | 99.2 | 0.55 | 0.25 | — |
| B | 99.1 | 0.45 | 0.45 | — |
| C | 99.2 | 0.65 | 0.15 | — |
| D | 99.1 | 0.55 | 0.20 | 0.05 |
| E | 99.15 | 0.35 | 0.40 | 0.10 |
| F | 99.2 | 0.45 | 0.30 | 0.05 |

*US = remaining unidentified components.

What is claimed is:

1. Catalyst comprising cobalt manganese and copper in the form of their oxides, an alkali metal oxide and silicon dioxide, the weight ratio of cobalt to manganese being 25:1 to 1:1, the copper content being 0.01 to 2 percent by weight based on the total weight of catalyst, the amounts of metals in each case being calculated as metals.

2. Catalyst of claim 1 wherein the weight ratio of cobalt to manganese is 3:1.

3. Catalyst of claim 1 containing from 0.05 to 0.5 percent by weight copper, an amount of alkali metal oxide corresponding to 0.02 to 0.35 percent by weight of alkali metal and from 0.005 to 5 percent by weight of $SiO_2$, in each case based on the total weight of catalyst.

4. Catalyst of claim 1 wherein the alkali metal oxide content corresponds to 0.1 to 0.3 percent by weight of alkali metal, relative to the total weight of catalyst.

5. Catalyst of claim 1 containing from 0.05 to 3 percent by weight $SiO_2$, relative to the total weight of catalyst.

6. Catalyst of claim 1 containing potassium oxide as the alkali metal oxide.

7. Process for preparing a catalyst which comprises adding an excess of an aqueous solution of a hydroxide, bicarbonate or carbonate of an alkali metal to an aqueous solution of water-soluble cobalt salts, manganese-(II) salts and copper salts to form a precipitate, adding an aqueous solution of an alkali metal silicate or $SiO_2$ sol to the precipitate, filtering off the precipitate and washing with water to remove excess alkali metal hydroxide, bicarbonate or carbonate, and thereafter drying and calcining the precipitate.

8. Process of claim 7 wherein the aqueous solution of an alkali metal silicate is a water-glass solution.

9. Process of claim 8 wherein, after the water-glass solution is added and before the precipitate is filtered off, the mixture is stirred for 2-4 hours.

10. Process of claim 7 wherein the alkali metal carbonate is potassium carbonate.

11. Process for preparing a catalyst which comprises adding aqueous ammonia or ammonium carbonate solution to an aqueous solution of water-soluble cobalt salts, manganese-(II) salts and copper salts to form a precipitate, adding an aqueous solution of an alkali metal salt or an appropriate amount of solid alkali metal salt to the precipitate, further adding an aqueous solution of an alkali metal silicate or $SiO_2$ sol to the precipitate, filtering off the precipitate and drying and calcining same.

12. Catalyst of claim 1 in the form of a powder containing 0.1 to 2% by weight of graphite as a lubricant, based on the weight of catalyst.

13. Catalyst of claim 1 treated with hydrogen.

14. A process according to claim 7 wherein an $SiO_2$ sol is added to said precipitate.

15. A process according to claim 11 wherein an $SiO_2$ sol is added to said precipitate.

* * * * *